United States Patent [19]
Nishijima et al.

[11] Patent Number: 4,806,929
[45] Date of Patent: Feb. 21, 1989

[54] REMOTE MONITOR CONTROL SYSTEM

[75] Inventors: Kazuo Nishijima, Hitachi; Terunobu Miyazaki, Ibaraki; Eisaburo Sakou, Hitachi, all of Japan

[73] Assignee: Hitachi, Ltd., Tokyo, Japan

[21] Appl. No.: 32,446

[22] Filed: Mar. 31, 1987

[30] Foreign Application Priority Data

Mar. 31, 1986 [JP] Japan ................................. 61-73718

[51] Int. Cl.$^4$ ........................ H04Q 9/00; G05B 23/02
[52] U.S. Cl. ....................... 340/825.060; 340/825.650; 340/310 R
[58] Field of Search ...................... 340/825.06, 825.14, 340/825.2, 310 A, 310 R, 825.13, 825.65, 825.07

[56] References Cited

U.S. PATENT DOCUMENTS

| 4,112,416 | 9/1978 | Hasegawa et al. | 340/825.07 |
| 4,114,138 | 9/1978 | Demers | 340/825.65 |
| 4,604,618 | 8/1986 | Akiba et al. | 340/825.06 |
| 4,680,582 | 7/1987 | Mejia | 340/825.14 |

OTHER PUBLICATIONS

"Development and Field Test on a Distribution Line Carrier Communication System", by Akira Miyahara et al., IEEE Transactions on Power Delivery, vol. PWRD-1, No. 3, Jul. 1986.

Primary Examiner—Donald J. Yusko
Attorney, Agent, or Firm—Antonelli, Terry & Wands

[57] ABSTRACT

A remote monitor control system comprises a single master station having the function of communication in synchronism with communication clocks for generating various commands required for monitor and control, and a plurality of terminal stations having the function of communication in synchronism with the communication clocks for receiving data related to objects of monitor and controlling objects of control. The terminal stations are caused to respond at different time points sequentially predetermined different times after transmission from the master station. When a sync signal fails to be received for a predetermined length of time, the predetermined time set for a particular station is shortened.

14 Claims, 13 Drawing Sheets

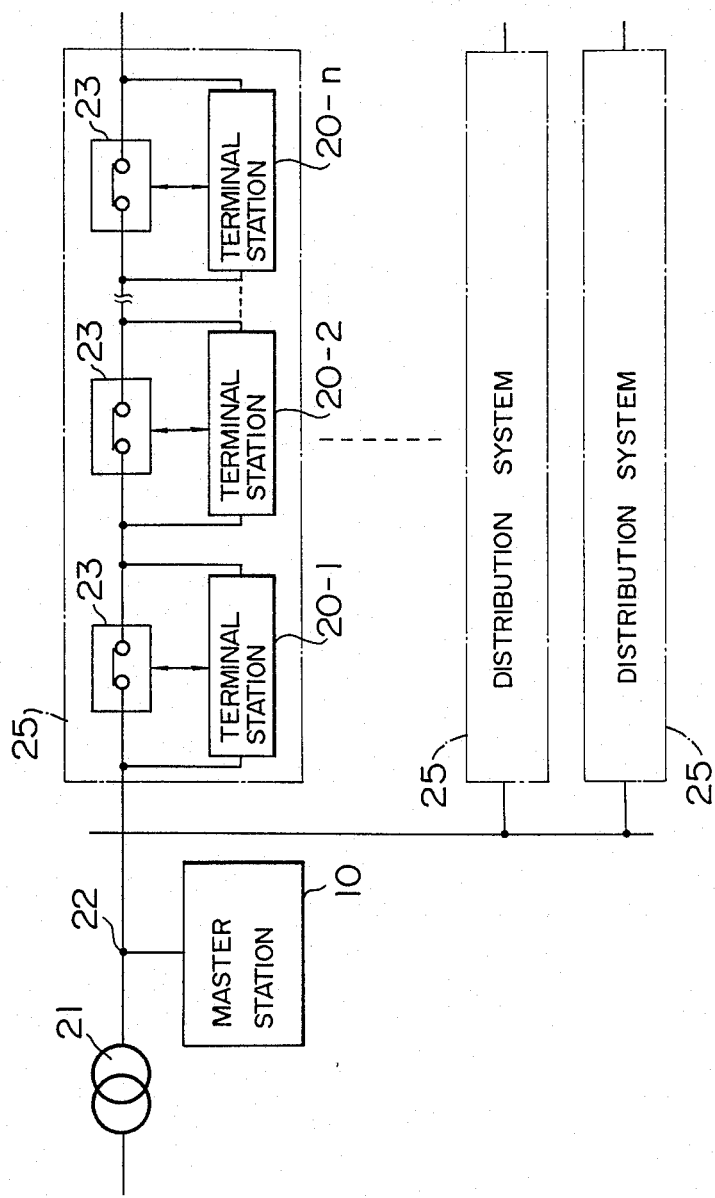

FIG. 11

| Yn/Xn | 1 | 2 | - - - - - - - - - - - - - | 10 |
|---|---|---|---|---|
| 0 | 1 | 2 | - - - - - - - - - - - - | 10 |
| 1 | 11 | 12 | - - - - - - - - - - - - - | 20 |
| - | - | - | | - |
| - | - | - | | - |
| - | - | - | | - |
| - | - | - | | - |
| - | - | - | | - |
| - | - | - | | - |
| - | - | - | | - |
| 8 | 81 | 82 | - - - - - - - - - - - - - | 90 |
| 9 | 91 | 92 | - - - - - - - - - - - - - | 100 |

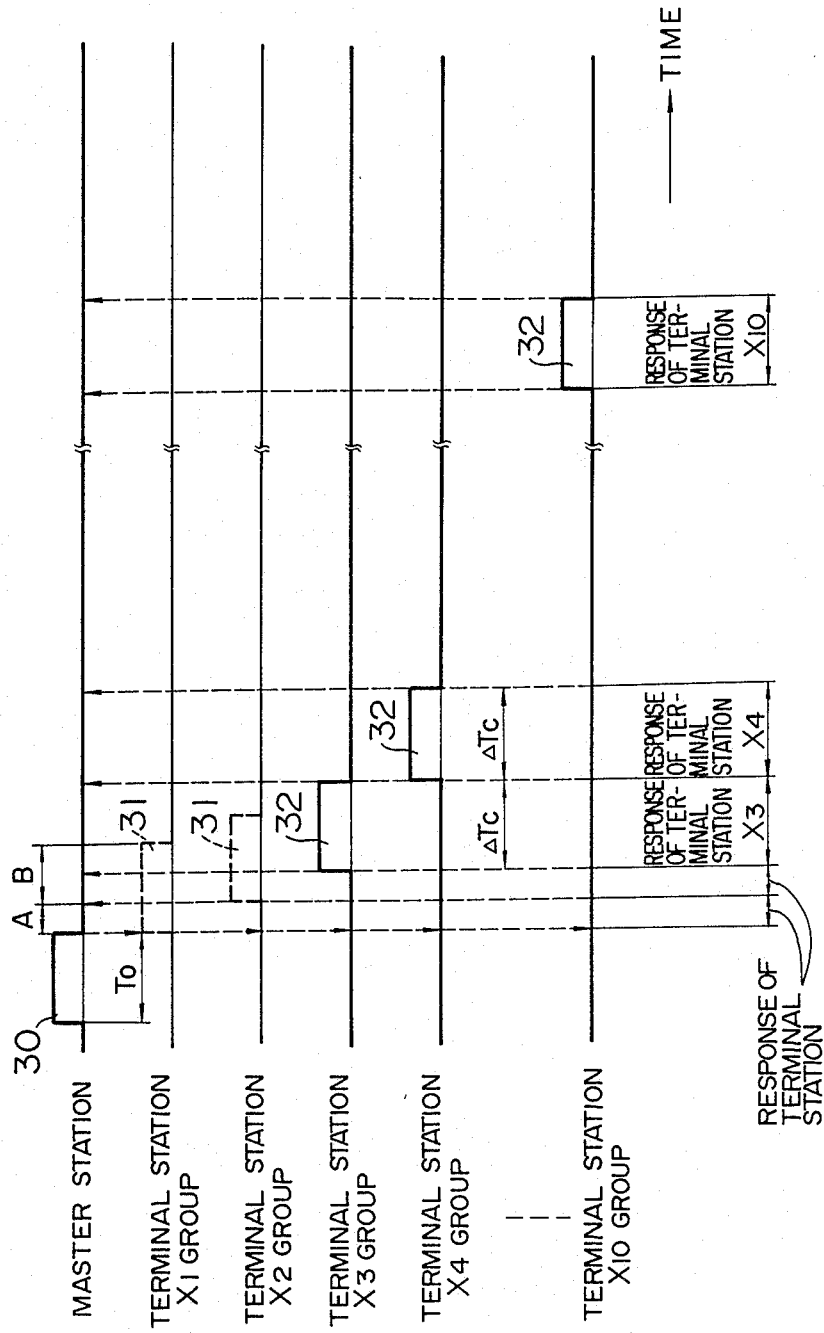

REMOTE MONITOR CONTROL SYSTEM

BACKGROUND OF THE INVENTION

The present invention relates to a remote monitor control system comprising a single master station and a plurality of terminal stations, or more in particular to a remote monitor control system suitable for detecting a change in the conditions of an object being monitored within a short time.

As a remote control system of this type, explanation will be made about a power line carrier system using a distribution line for signal transmission between a master station and terminal stations by application of a zero-phase carrier transmission system.

FIG. 1 is a circuit diagram showing the principle of a zero-phase carrier transmission system of such a type.

In FIG. 1, reference numeral 1 designates a transmitter, numeral 2 a sync circuit, numeral 3 a control command generator, numeral 4 a three-phase ground static capacity, numeral 5 a capacitor, numeral 6 a receiver, numeral 7 a vector combiner, numeral 8 a sync detector, and numeral 9 a three-phase capacitor voltage divider. Reference characters $E_{ab}$, $E_{bc}$, $E_{ca}$ designate power supplies, a, b, c three-phase distribution lines, and $L_1$, $L_2$, $L_3$ loads. Numeral 10 designates a master station comprising a transmitter 1 and a receiver 6, which are controlled by a processor including a control processor 11, an input/output unit 12, and a memory unit 14. Numeral 20 designates a terminal station, comprising a receiver 6 and a transmitter 1, which are controlled by a processor including a processing control unit 15 and an output unit 16.

Now, this monitor system employing a zero-phase carrier transmission system will be explained with reference to FIG. 2. A monitor system of zero-phase carrier transmission type is disclosed in a reference entitled "Development and Field Test on a Distribution Line Carrier Communication System", by Akira Miyahara et al., IEEE Transactions on Power Delivery, Vol. PWRD-1, No. 3, July 1986.

An output signal corresponding to a transmission code (FIG. 2(A)) from a control processor 11 is applied to a sync circuit 2 through a control command generator 3. With one of the three phases as a reference (such as phase 3), the frequency of the reference phase and the output signal mentioned above are applied to the sync circuit 2, and according to these signals, an output of the sync circuit 2 is formed, whereby a small-capacity capacitor 5 inserted between the phase C of the three-phase distribution line and ground is turned on and off by switching means. The turning on and off of the capacitor 5 generates an imbalance of the three-phase ground static capacitor 4 thereby to generate a zero-phase voltage (FIG. 2(B)) corresponding to the transmission code over the whole distribution system. The zero-phase voltage (FIG. 2(B)) is transmitted without any substantial attenuation to the end of the distribution system.

In the receiver 6, on the other hand, each voltage produced from the three-phase voltage divider 9 is combined by the vector combiner 7 as a zero-phase voltage output. The output of the vector combiner 7 and the output of the phase-C capacitor voltage divider are applied to the sync detector 8. The sync detector 8 performs the integrating operation, and a DC component is taken out of the output of the integrating operation as shown in FIG. 2(C), thereby reproducing the transmission code as shown in FIG. 2(D).

In a remote monitor system for data transmission comprising the master station 10 including the transmitter 1 and the receiver 6 and a plurality of terminal stations 20 for performing the monitoring of the conditions and controlling the operation of the switches, etc. installed on the distribution lines, a common concept for enabling the master station 10 to grasp the conditions of all the switches is to transmit data by a polling system. The polling system is one in which communication is established one by one with all the terminal stations under the control of the master station for data transmission relating to the conditions of switches, etc.

In the case of a polling system, however, as shown in FIG. 3, the master station 10 makes an inquiry to terminal stations 20-1, 20-2, 20-3, . . . , 20-n in sequence, and these terminal stations answer the inquiries upon receipt thereof from the master station 10. If the conditions of the switches, for example, of all the terminal stations 20-1, 20-2, 20-3, . . . , 20-n are to be grasped, a transmission time proportional to the number of the terminal stations 20 is required, which poses the problem of a long time being required to grasp a change in the conditions of a given switch that may occur.

Now, calculation will be made of the time required for communication with the number n of terminal stations 20 under the above-described polling system.

The communication time t with given terminal station 20 is the sum of the transmission time from the master station 10 to the terminal station 20 (FIG. 3($t_A$)) and the response time from the particular terminal station 20 to the master station (FIG. 3($t_B$)). Therefore, the total time T required for completing the communications with the number n of terminal stations is given as $$T = n \times t \tag{1}$$

It is understood from this that the communication time proportional to the number of terminal stations is required.

FIG. 4 shows an example of the transmission format.

Apart from this communication system, the communication according to a power line carrier system with a distribution line as a signal transmission path requires a technique described below to improve the transmission reliability.

(I) Double-transmission system

In this system, a "word" having the same content is transmitted twice to improve the reliability (sometimes with an inverted code for the second word.)

(II) nCr code system

This system is such that the number of codes "1" and codes "0" making up each word is predetermined.

(III) Parity check system

In this system, the number of codes "1" making up a word is predetermined as either an even or an odd number.

Various ideas as mentioned above are required if the transmission reliability is to be improved. As a result, the amount of transmission necessary for communication increases to a considerable degree (Three terminal station addresses are required as shown in FIGS. 4A and 4B, for instance.).

Assume that each word comprises eight codes and the above-mentioned transmission system is used. The amount of transmission in the transmission format shown in FIG. 4 is such that signals of the following format (a total of 72 bits) is generated from the master station to the terminal stations:

| Sync signal | Eight codes |
|---|---|
| Command codes | 8 bits × 2 (double transmission) = 16 codes |
| Addresses | (8 × 2 (double transmission)) × 3 (digits) = 48 codes |

Signals of the following format (a total of 72 bits) are transmitted from the terminal stations to the master station.

| Sync signal | Eight codes |
|---|---|
| Switch conditions | 8 bits × 2 (double transmission) = 16 codes |
| Addresses | (8 × 2) × 3 = 48 codes |

It is thus seen that a total of 144 bits including 72 bits of transmission codes from the master station and 72 bits of response codes are required for the communication with each terminal station. If the system frequency is the transmission speed (50 or 60 BPS), it takes 29 or 24 seconds (for 50 BPS) to establish communication with one terminal station.

If ten switches are installed for each distribution line and ten distribution lines for each bank, on the other hand, it is necessary for the master station to monitor the conditions of 100 switches under normal state. This means a considerable time required for monitoring.

Generally, the conditions of the switches of the distribution system do not undergo frequent changes, but only about once every one or several days. A change of the conditions of the switches of the terminal stations, however, should be desirably detected as early as possible for the purpose of early detection of the power failure or the like of the user. In order to constantly monitor the condition change that rarely occurs, therefore, a technique has been required to monitor any condition change for all the terminal stations repetitively in cycles of a short time.

SUMMARY OF THE INVENTION

The object of the present invention is to provide a remote monitor control system for detecting condition changes of the system at an early time by simultaneous exchange of communications between the master station and a plurality of terminal stations by use of distribution lines as signal transmission paths.

According to the present invention for solving the above-mentioned problem, there is provided a remote monitor control system comprising a master station having the function of communication in synchronism with communication clocks for generating various commands necessary for monitor and control and a plurality of terminal stations having the function of communication in synchronism with the communication clocks for receiving the conditions of an object being monitored and for controlling an object of control at the same time, wherein only those terminal stations of which the object being monitored undergoes a change give a response in a predetermined sequence to permit detection of a condition change of the object of monitor in a single data exchange, the communication clocks are counted by the master station and the terminal stations simultaneously from the time of completion of transmission of master station commands as a system synchronizing point, and if there is not any response from terminal stations assigned to a predetermined response time, the response time of each subsequent terminal station is advanced by a predetermined length (a predetermined number of clocks).

For both the master station and the terminal stations, the number of clocks from the completion of transmission from the master station are counted simultaneously by both the master and terminal stations with the transmission signal of the master station being used as an origin with reference to a common communication clock for the whole system.

Each of the terminal stations has different addresses and its specific timing of response is determined with its address as a parameter of the time function after completion of transmission from the master station. These addresses are assigned continuously to all the terminal stations, and the master station stores the last address.

In this way, the master station issues a command to all the terminal stations for causing a response only from a terminal station or stations for which a condition change of the switches has been detected, and after transmission of the command, the master station sets the number of clocks that occurs before the response from the terminal station of the last address.

Each terminal station, on the other hand, sets the number of clocks for the waiting time before start of its response, and monitoring the clocks by the system frequency, subtracts the clocks thus set one by one. The time before response mentioned above is a time zone during which other terminal stations are to make a response. Upon recognition of the absence of a response signal, the response start timing of a particular terminal station is shortened by the number of transmission clocks (fixed value) scheduled for the non-responding terminal stations and the master station performs exactly the same process.

In this manner, the master station is able to grasp each terminal station for which the conditions have changed within a short time according to the position of the terminal stations that have responded (the number of clocks from the completion of transmission by the master station).

BRIEF DESCRIPTION OF THE DRAWINGS

FIGS. 5A, 5B, 5C are system diagrams showing an example in which an embodiment of the present invention is applied to a distribution system.

FIG. 11 is a diagram showing a grouping according to another embodiment of the present invention.

FIG. 12 is a timing chart showing the operation of a remote monitor system similar to the one shown in FIG. 8 according to another embodiment of the present invention.

DESCRIPTION OF THE PREFERRED EMBODIMENTS

Figure 1:
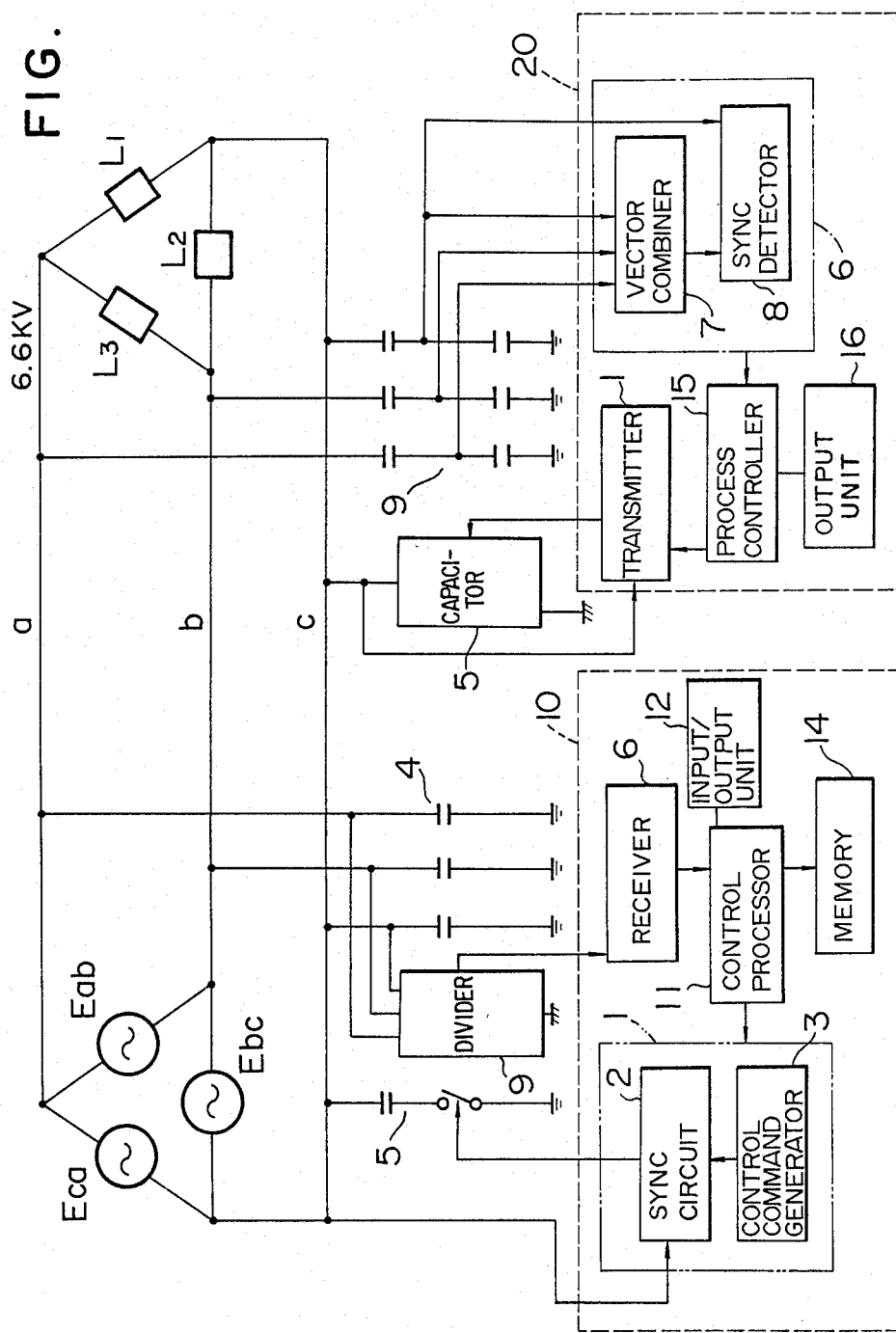
FIG. 1 is a block diagram showing the principle of the zero-phase carrier transmission system.
Figure 2:
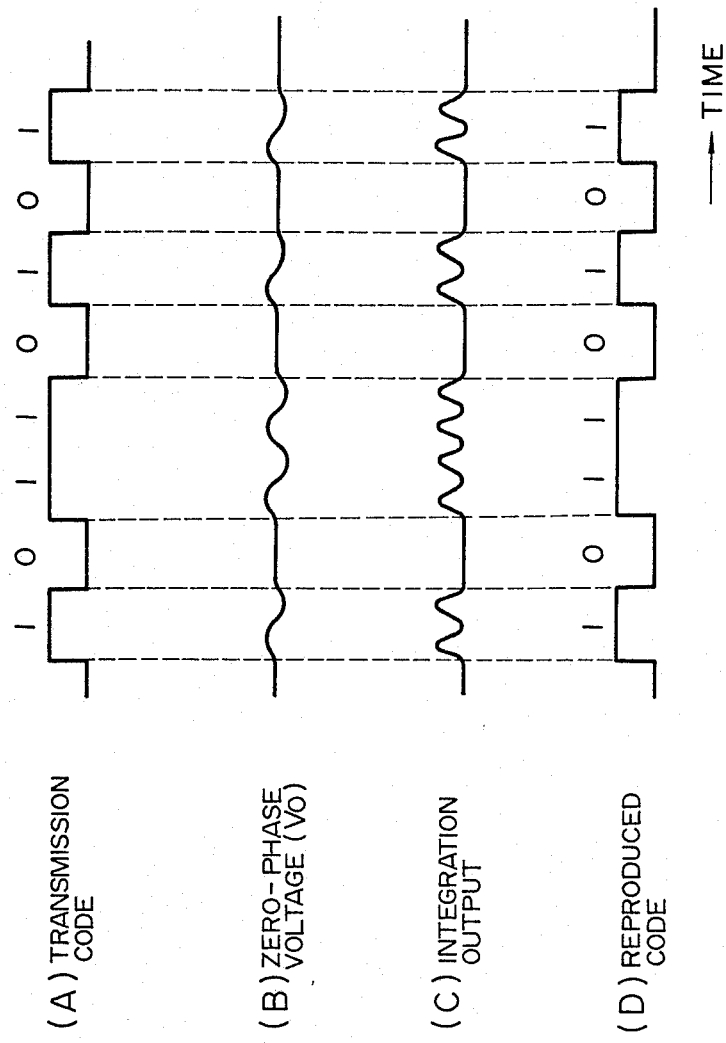
FIG. 2 is a diagram showing signal waveforms used conventionally in a zero-phase carrier transmission system.
Figure 3:
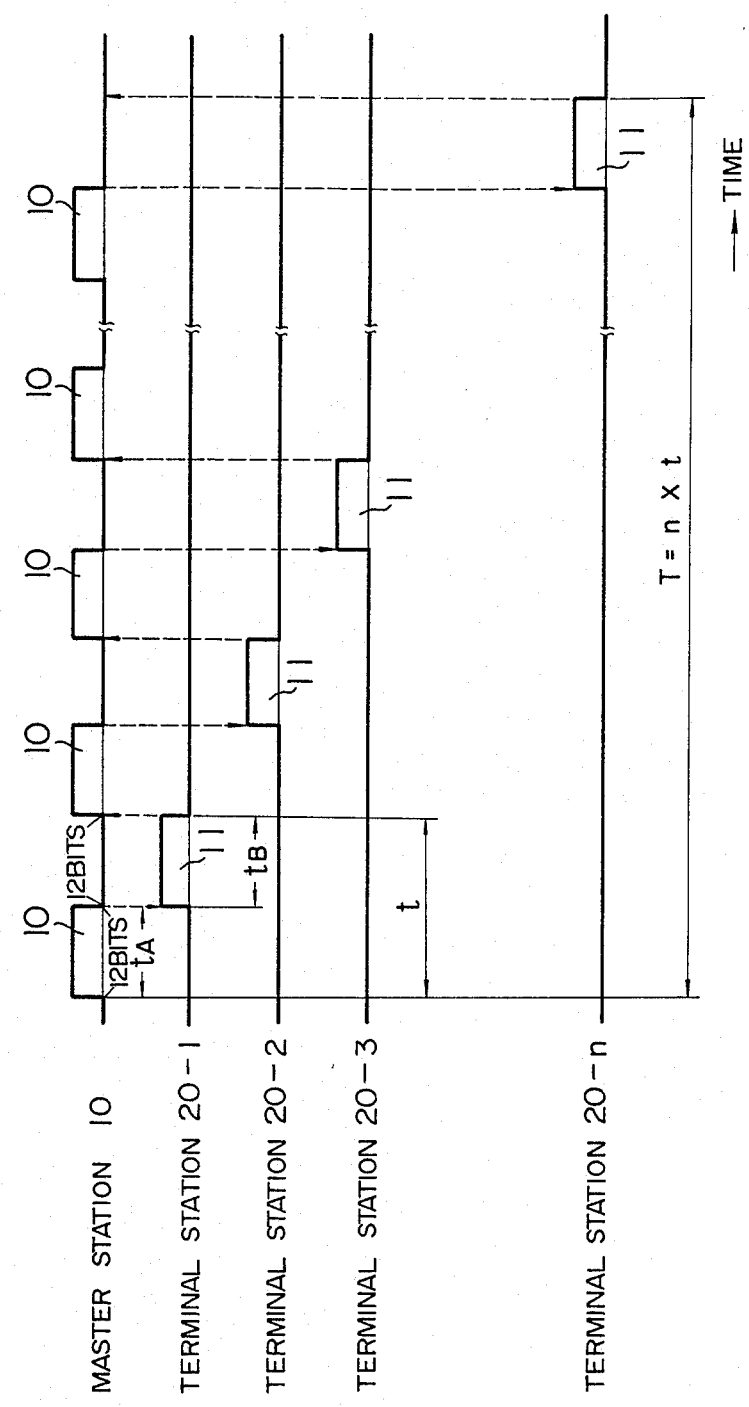
FIG. 3 is a timing chart for explaining a conventional polling monitor system.
Figure 4A:
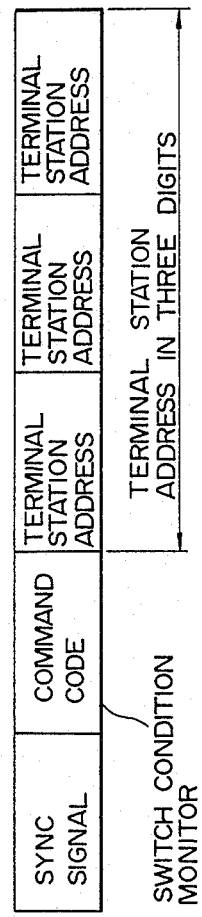
FIGS. 4A and 4B are diagrams showing transmission formats of a polling monitor system.
Figure 4B:
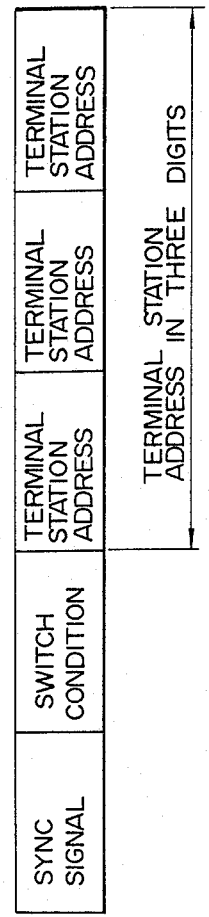

An embodiment of the present invention will be explained below with reference to the accompanying drawings.

FIG. 5A is a block diagram showing an embodiment of the present invention applied to a distribution system.

In FIG. 5A, reference numeral 21 designates a distribution transformer, the secondary of which is provided with a master station 10 having the communication function of zero-phase carrier transmission system with the distribution line 22 as a signal transmission path.

The distribution system has a multitude of switches 23 arranged therein and a plurality of terminal stations 20-1, 20-2, 20-3, . . . , 20-n for receiving the operating conditions of each switch and generating an operation control command therefor. The terminal stations 20-1, 20-2, 20-3, . . . , 20-n have also the communication function of a zero-phase carrier transmission system.

Figure 5B:
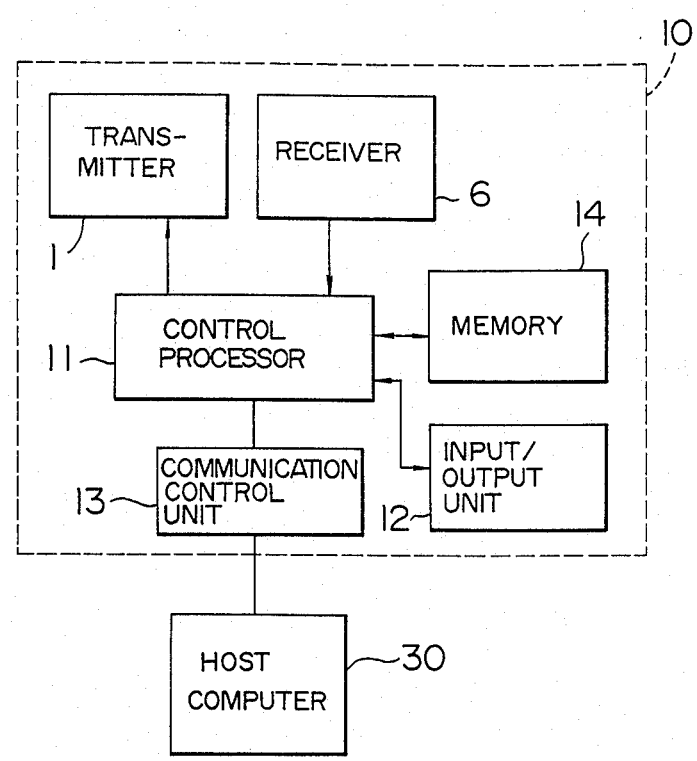

FIG. 5B is a block diagram showing a configuration of the master station 10.

The master station 10 includes a transmitter 1, a receiver 6, a control processor 11, an input/output unit 12, a communication control unit 13, and a memory unit 14. The input/output unit 12 is connected to a host computer 30.

The command, etc. from the host computer 30 is applied through a communication control unit 13 to the control processor 11.

Figure 5C:
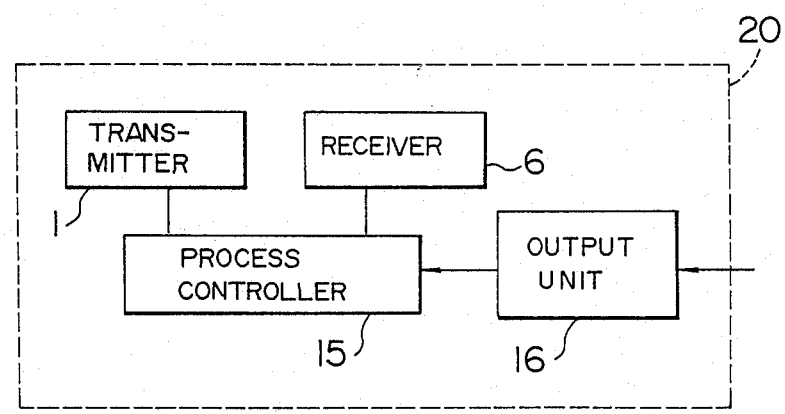

FIG. 5C is a block diagram showing a configuration of a terminal station 20.

The terminal station 20 includes a transmitter 1, a receiver 6, a control processor 15, and an input/output unit 16. The input/output unit 16 is adapted to be impressed with the data from the switches 23, which data is applied to the control processor 15.

Figure 6:
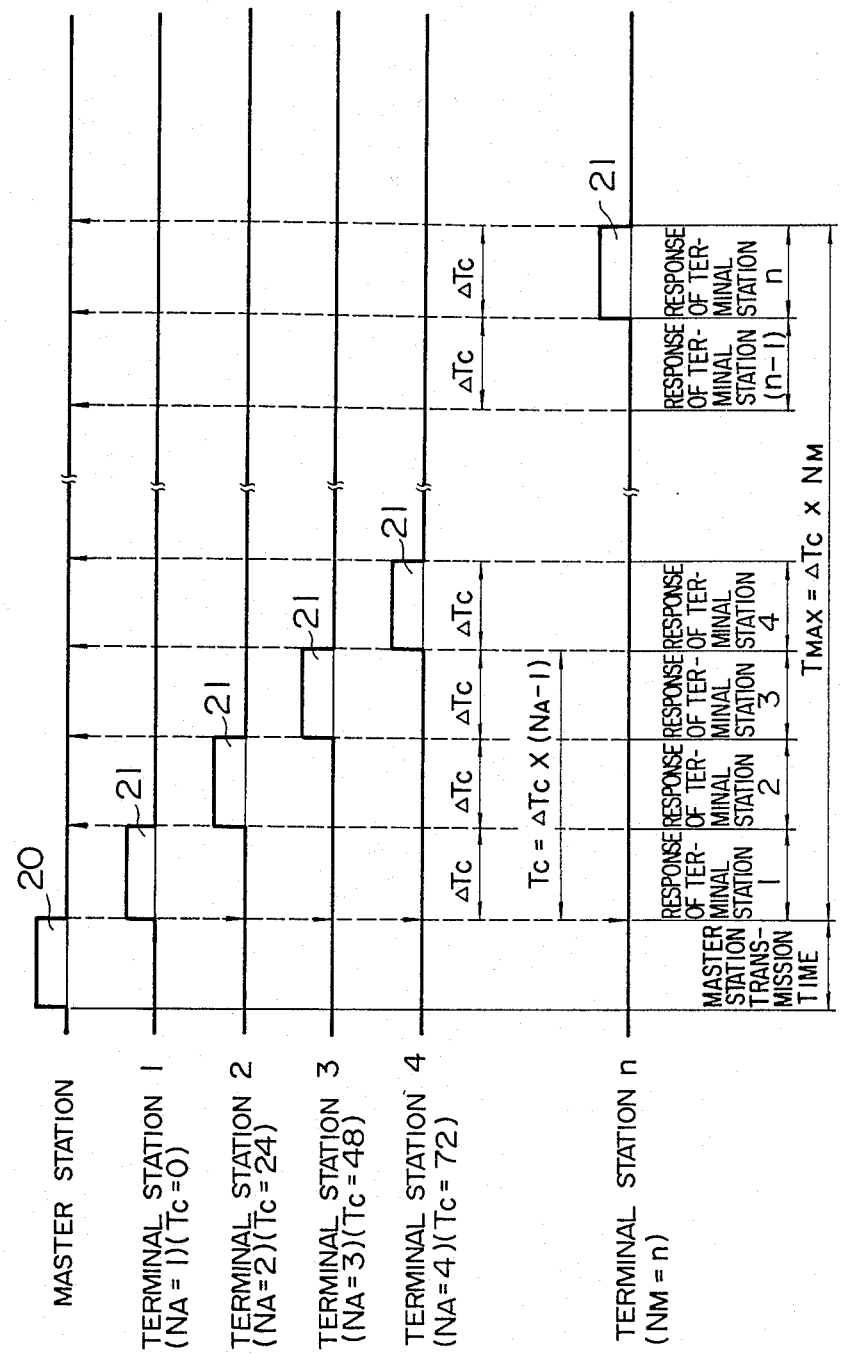
FIG. 6 is a timing chart for a system for monitoring conditions changes of switches according to the prior art.
Figure 8:
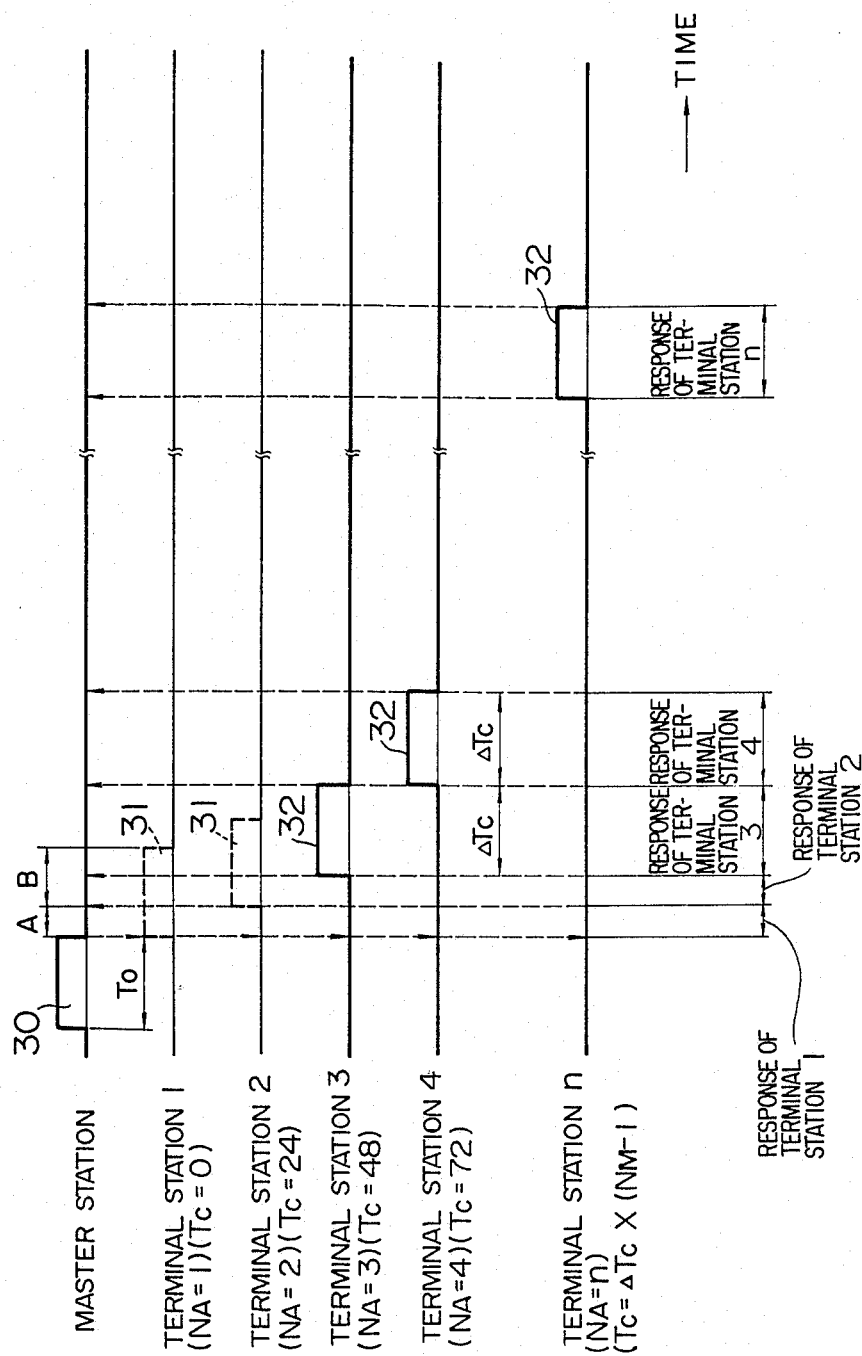
FIG. 8 is a timing chart for explaining an embodiment of the present invention.
Figure 9:
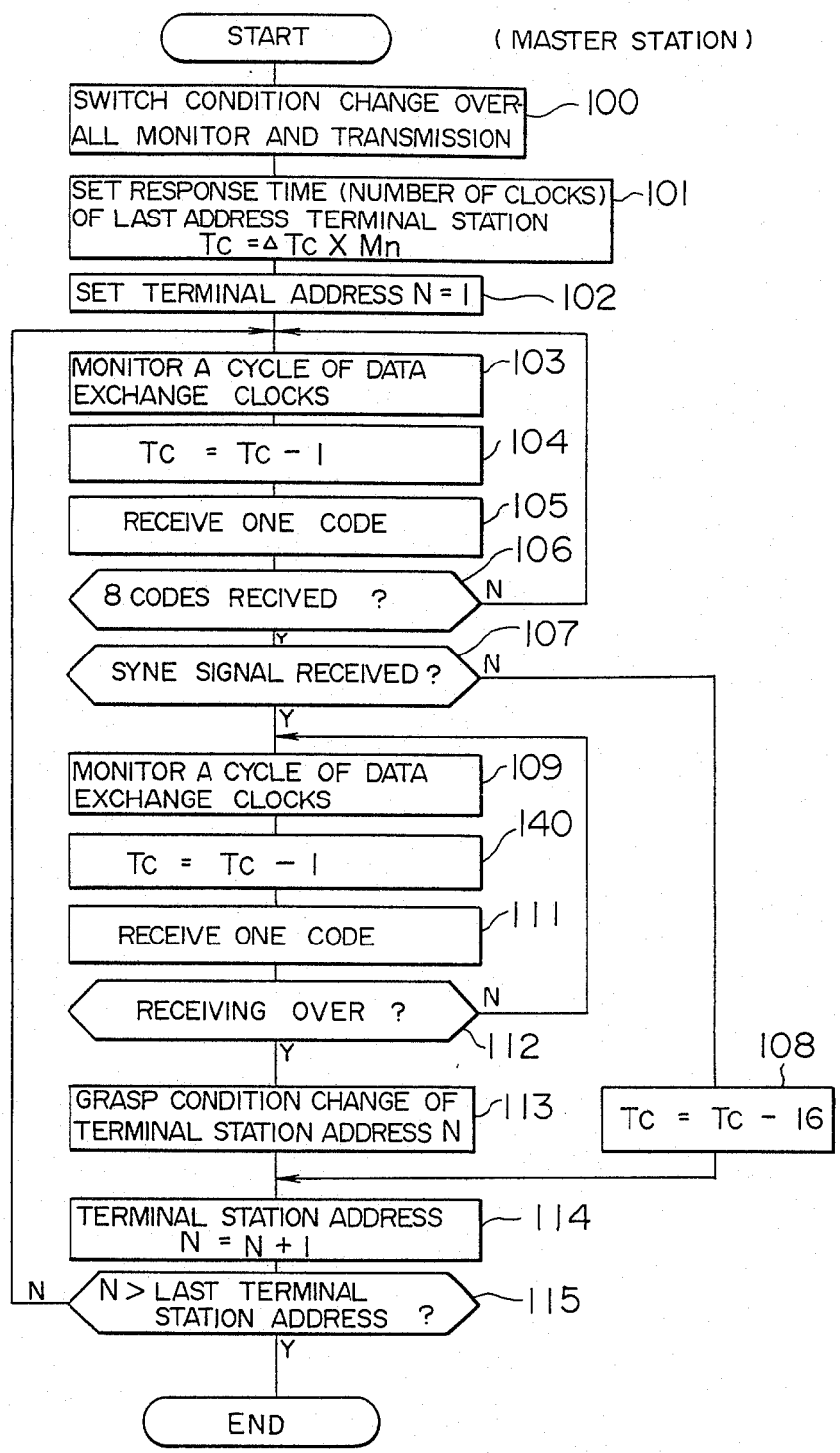
FIG. 9 is a flowchart for explaining the operation of the master station according to an embodiment of the present invention.

The operation of an embodiment having a configuration described above will be explained below with reference to FIGS. 5, 7, 8, 9 and 10. FIG. 9 shows the operation of the master station, and FIG. 10 the operation of the terminal stations. The master station 10 transmits to all the terminal stations 20-1, 20-2, 20-3, . . . , 20-n according to the principle of the zero-phase carrier transmission system such a command that a response is received only from a terminal station(s) of which any of the switches 23-1, 23-2, . . . , 23-n being monitored thereby develops a condition change (Step 100 in FIG. 9). A terminal station 20 that has reproduced and received the zero-phase voltage sets the time from the complete receipt of the command from the master station 10 to the start of its response, as a number of data exchange clocks based on the system frequency by the address of the particular terminal station as a parameter (Steps 200, 201 of FIG. 10). The time before receiving the response will be studied below with reference to FIGS. 6 and 8. In FIGS. 6 or 8, $T_c$ designates a waiting time before response (number of clocks), $\Delta T_c$ the number of clocks required for response from a terminal station, and $N_A$ the address of the particular terminal station. The waiting time $T_c$ before start of the response of the terminal station 20 having the address $N_A$ is given as $$T_c = \Delta T_c \times (N_A - 1) \tag{2}$$

Each of the terminal stations 20-1, 20-2, 20-3, . . . , 20-n sets its response start time $T_c$ determined from equation (2) on the basis of the address $N_A$ of the particular terminal station.

On the other hand, the master station 10 stores the last address $N_M$, and after generation of a command for detection of a condition change, stores it as the maximum value (number of clocks) of the response time from the terminal stations 20 (Step 101 in FIG. 9).

Now, explanation will be made of the manner in which the maximum value of the response time is determined, with reference to FIGS. 6 and 8. Assume that $N_A$ is the maximum address of the terminal station 20-n, and $T_{MAX}$ the maximum response time from the terminal station 20-n. The response time $T_{MAX}$ from the terminal station 20-n is expressed as $$T_{MAX} = \Delta T_c \times N_M \tag{3}$$

This time $T_{MAX}$ is set by the master station 10. Then, after completion of the command from the master station 10 for condition change detection, both the master station 10 and the terminal stations 20 monitor the transmission/receiving (data exchange) clocks in phase with the system carrier frequency, while at the same time reproducing the zero-phase voltage to monitor the response signal from the terminal stations 20 (Steps 103 and so on in FIG. 9, and stops 202 and so on in FIG. 10).

Figure 7A:
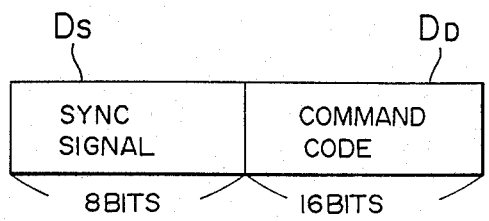
FIGS. 7A, 7B are diagrams for explaining an example of the format of a transmission signal for monitoring a change in switch condition.
Figure 7B:
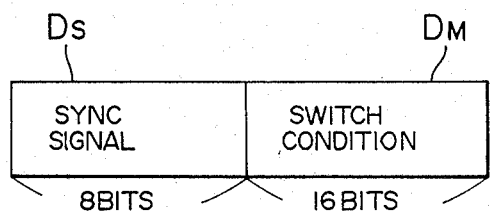

An example of the transmission format for monitoring process of switch condition changes according to the embodiment under consideration is shown in FIGS. 7A and 7B. Assuming a double transmission system having 8 codes in a word, the format shown in FIG. 7A is the one of the signal from the master station 10 to the terminal stations 20. Character $D_S$ designates a sync signal, and $D_D$ a command code, that is, a switch condition change monitor command. The format shown in FIG. 7B, on the other hand, is the one of the signal from the terminal stations 20 to the master station 10, where $D_S$ is a sync signal, and $D_M$ a signal indicating the switch condition. The sync signal $D_S$ is assigned with eight codes, and the command code $D_D$ 16 codes ($=8 \times 2$), and the switch condition signal $D_M$ 16 codes ($=8 \times 2$). Even if all the terminal stations 20 make a response, the total number N of codes on transmission is $$N = 24 + (24 \times N_M) \tag{4}$$

In equation (4) above, the first term represents the transmission time of the master station 10, and the second term the total response time of the terminal stations 20.

Now, the master station 10 monitors the response signals from the terminal stations 20 (Steps 103 to 106, FIG. 9). Each terminal station 20, on the other hand, monitors the response signals from the other terminal stations 20 until the response is given from the particular terminal station (Step 203 to 206 in FIG. 10). Specifically, the transmission/receiving clocks are monitored (Step 103 in FIG. 9, and step 203 in FIG. 10), and the master station subtracts one by one from the "maximum response time from the terminal stations 20" (Step 104 in FIG. 9). Similarly, the terminal stations 20 subtract one by one from the "waiting time before storing response" (Step 204 in FIG. 10). It is decided whether a code has been received for both ways of transmission and receiving (Step 105 in FIG. 9, and step 205 in FIG. 10), and then whether eight codes have been received. If the answer is NO, the process proceeds to step 103, while if the answer is YES, to step 107. It is decided as mentioned above whether eight codes have been received or not for the purpose of detecting whether a given terminal station has assumed a position (time) ready for responding.

If the absence of response signal from a given terminal station 20 that has assumed the responding position is recognized by the master station 10 and the other terminal stations (including the case of absence of a response signal from a given terminal station) (NO at step 107 in FIG. 9, and step 207 in FIG. 10), the particular terminal station decides that there is no condition change, so that the response time for the switch conditions scheduled for by the particular terminal station 20 (a fixed 16 code signal under this embodiment) is subtracted from the "maximum response time $T_C(=T_{MAX})$ from the terminal stations" (step 108 in FIG. 9) by the master station 10, and from the "waiting time $T_C$ before response start" by the terminal stations 20 (step 208 in FIG. 10), thereby shortening the required transmission time for monitoring process of the switch condition changes (See FIG. 8).

Figure 10:
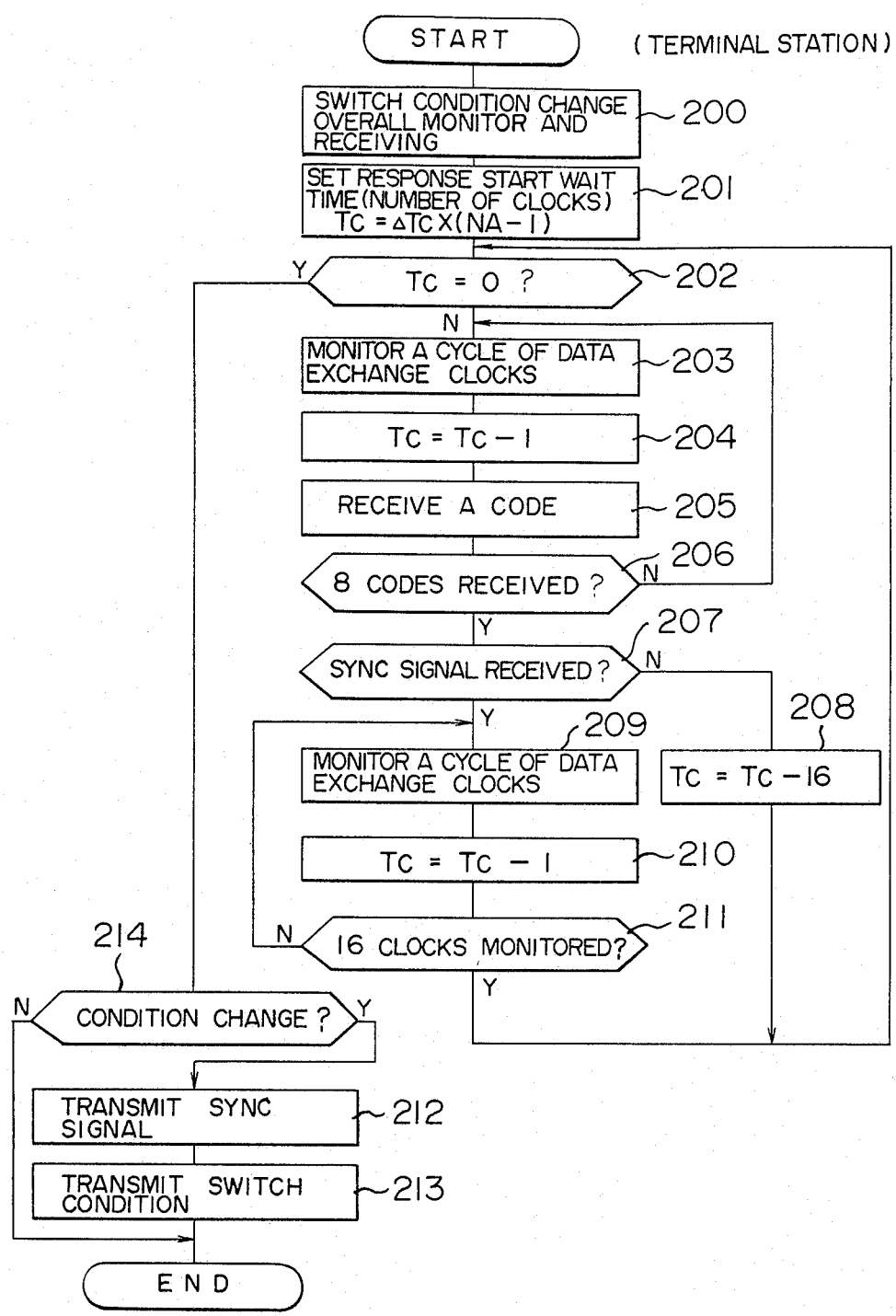
FIG. 10 is a flowchart for explaining the operation of the terminal stations according to an embodiment of the present invention.

Specifically, the time within the scope A (8 bits) in FIG. 8 is monitored by the steps 103 to 106 in FIG. 9, and the steps 202 to 204 in FIG. 10. As a result, assume that if step 214 detects a condition change, for instance, step 212 transmits a sync signal, while if step 213 does not detect any switch condition change, such transmission is not made. The master station 10 and the terminal stations 20-2 and so on repeat the steps 103 to 106 and 203 to 206 to monitor the sync signal. If the data DM of FIG. 7B is not sent after receipt of eight codes, therefore, the process proceeds to steps 107 and 207. In steps 107 and 207, the subtraction $T_C = T_C - 16$ is made, so that the master station 10 proceeds to step 114, and the terminal station 20-2 and so on to step 202. In the process, the terminal station 20-2 proceeds to step 214, and in the absence of a switch condition change, the process ends, without transmitting the data portion $D_M$. The terminal station 20-3 thus makes an immediate response.

The terminal station 20-3 generates a sync signal at step 212, and in the case of any switch condition change, transmits a related signal at step 213. In the presence of this response signal, the master station shifts to steps 107, 109, and monitoring a cycle of clocks, subtracts one from the response signal time $T_S$ (step 110), receives one code (step 111), confirms whether the 16 clocks (that is, the receiving signal) have been completed, and if completed, proceeds to step 109, or if uncompleted, to stop 113. Step 113 grasps any condition change of the terminal station 20 with the address N, followed by step 114 to update the terminal station address N. After deciding whether the terminal station address is the last one or not, the process proceeds to step 103 if it is not the last step. The terminal station, on the other hand, proceeds to steps 207, 209, and at step 209, a cycle of clocks is monitored to count 16 clocks.

It rarely happens that the conditions of the switches change at the same time. Assume, therefore, the condition of a given switch changes. The total number N' of codes for transmission is given as $$N' = 24 + \{8 \times (N_M - 1) + 24\} \quad (5)$$

In equation (5), the first term in the right side represents the transmission time ($T_P$) of the master station, the left term in the right side the time (A) required for deciding the presence or absence of response from the terminal stations, and the right term of the second term in the right side the response time (A+B) of the terminal stations.

If there are 100 terminal stations and the transmission speed on the system frequency is 60 PBS, the time required for detecting a condition change is compared between the prior art systems and the system according to the present invention as shown below.

(1) Polling system

From equation (1), $$\frac{72 \text{ (bits)} \times 2}{60 \text{ (BPS)}} \times 100 \text{ (number of terminal stations)} = \quad (6)$$

$$240 \text{ (secs)}$$

(2) Overall monitor system not shortening the response time of non-responding terminal stations From equation (3), $$\frac{24 + (24 \times 100 \text{ (number of terminal stations)})}{60 \text{ (BPS)}} = 40.0 \text{ (secs)} \quad (7)$$

(3) System according to invention

From equation (5), $$\frac{24 + (8 \times 99 + 24)}{60 \text{ (BPS)}} = 14.0 \text{ (secs)} \quad (8)$$

It will be seen from this that the system according to the present invention has the great advantage of being capable of detecting a switch condition change within a short time.

According to the present embodiment, after the monitoring process for a switch condition change from the master station 10, the waiting time (number of clocks) is set for both the master station 10 and the terminal stations 20 on the assumption that all the terminal stations 20 respond, so that the transmission/receiving clocks are monitored and subtracted one by one, and after confirmation of the absence of a response from the terminal stations 20, a predetermined number of clocks is subtracted. As an alternative to this method, another method may be employed in which on the assumption that there is no condition change in the distribution system, the number of clocks for confirming the absence of response from the terminal stations is set in advance, and if there is any response from the terminal stations 20, the remaining number of clocks for the response may be added to the set value.

Figure 11:
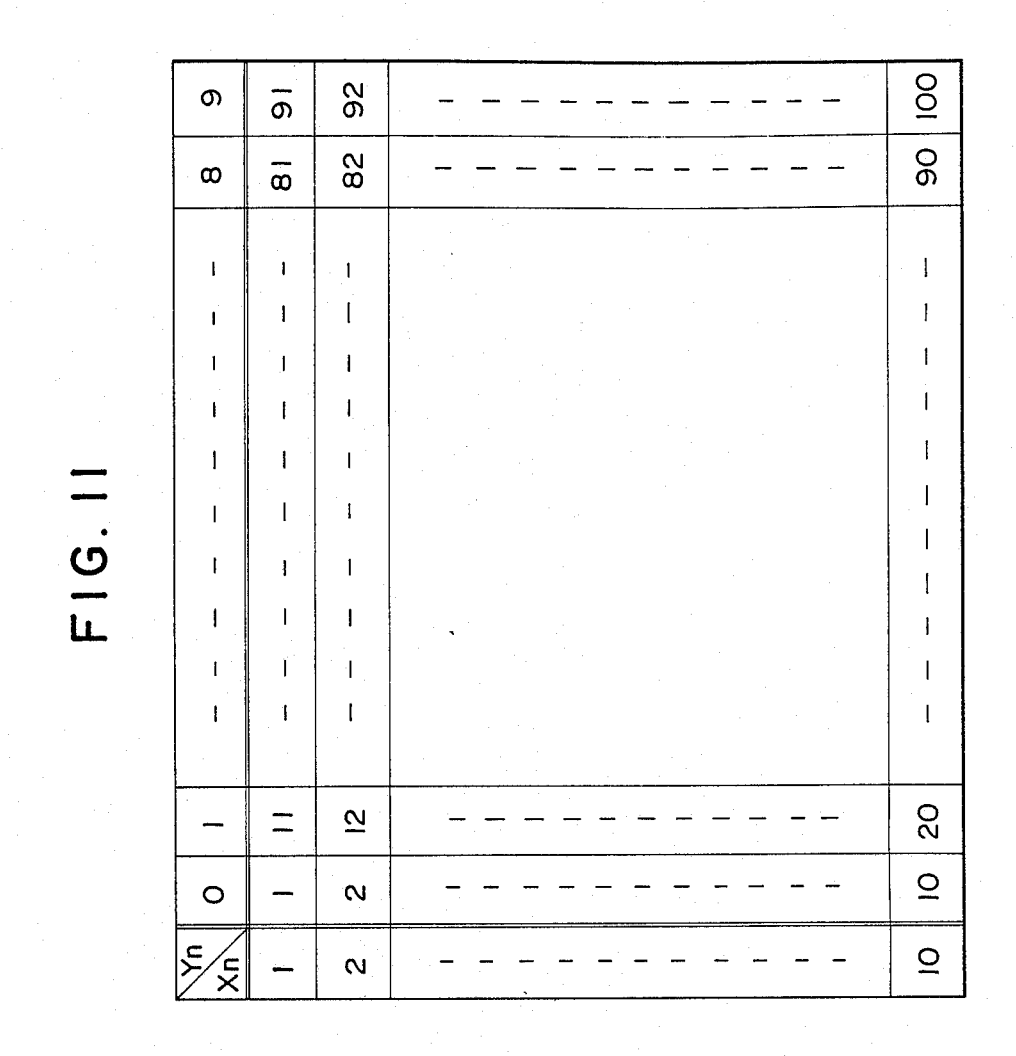

Another embodiment of the present invention is shown in FIGS. 11 and 12.

In the case where a great number of terminal stations 20 are involved, the terminal stations 20 are divided into a plurality of groups so that the terminal stations within a group are caused to respond at the same time thereby to detect any switch condition change within the particular group as a whole. In this case, although response signals may "bump" from different terminal stations, it is possible to grasp individual conditions of the terminal stations separately if the terminal stations of the particular group are then monitored for any switch condition change for separate response from each terminal station.

The time required for monitoring process for condition change is compared between the system according to the present invention and the above-mentioned embodiment below.

Assume that a total of 100 terminal stations are involved and are divided into groups of ten, that a condition change is detected in one of them. If the transmission speed is assumed to be 60 BPS, in the case of the above-mentioned embodiment, from equation (5), $$\frac{24 + (8 \times 99 + 24)}{60} + 14 \text{ (secs)} \quad (9)$$

In the case of the present embodiment, on the other hand, from equation (5), $$\frac{24 + (8 \times 9 + 24)}{60} + \frac{24 + (8 \times 9 + 24)}{60} = 4 \text{ (secs)} \quad (10)$$

The time can thus be reduced further in the embodiment under consideration. This advantage is obtained to the extent that the number of groups into which the terminal stations are divided is larger than that of the terminal stations that developed a condition change.

It is, therefore, necessary to group the terminal stations efficiently for facilitating the processing according to the system of this embodiment. There are methods for this purpose including the one in which if the terminal stations are divided into groups of ten in order of address, for instance, the addresses are assigned by a feeder, or the one in which if a condition change of a given group is to be grasped as the distance from a substation bus, addresses are assigned in the ascending order of distance from the substation bus.

Also, the addresses may of course be assigned by any of various methods, including:

(I) A method using the electrical work while mechanically fixed, or the lapping, etc.

(II) A switching means changeable manually, or (III) A method permitting the editing by the master station with a non-volatile loadable memory.

Specifically, in the case where a great number of terminal stations 20 are involved, the time required for communication is lengthened in proportion to the number of terminal stations if all of them are monitored at a time.

To cope with this problem, each of the terminal stations is assigned not with serial address numbers but two or more independent address numbers, so that a given terminal station can be specified by a combination of the address numbers. If the terminal stations are monitored for each of the address groups, it is possible to reduce the processing time required for monitoring.

For example, one hundred terminal stations are assigned two addresses X and Y, including $X_1$ to $X_{10}$ and $Y_0$ to $Y_9$. Then, by combinations of these numbers, one hundred terminal stations are identified (See FIG. 11). After the address numbers of the terminal stations are determined this way, an overall monitor command for the terminal station groups $X_1$ to $X_{10}$ having a condition change is issued by the technique of FIG. 8. Then, the result is obtained as shown in FIG. 12.

Specifically, if any of the terminal stations 1, 11, ..., 81, 90 develops a condition change, response is made that there is a condition change in the group $X_1$. If there is no condition change in these ten terminal stations, in contrast, no response is made. The next group $X_2$ including terminal stations 2, 12, 22, ..., 82, 92 responds only when any of them develops a condition change.

If there is no condition change of any of these groups, the next $X_3$ group responds at a predetermined progressively advanced time. In this way, the monitor for a condition change of ten X groups is repeated, and if there is any condition change detected for any station, $Y_0$ to $Y_9$ belonging to a particular $X_n$ group involved is specified to effect similar monitor. It is thus possible to identify a terminal station that has developed a condition change efficiently within a short time only by two overall monitoring operations.

Assume that one hundred terminal stations are divided into ten groups of ten stations and that the transmission speed of 60 BPS is involved for monitoring for a condition change for each terminal station.

As shown by equation (10) introduced from equation (5), the required time is four seconds.

It is obvious that if a plurality of X groups respond while they are under monitoring, the Y group should be monitored a plurality of times.

Apart from the aforementioned embodiment in which the terminal stations are divided into two groups of X and Y, this invention may be equally applied to the case in which the terminal stations may be divided into three groups X, Y and Z or more groups.

The foregoing description concerns means for early communication with terminal stations aimed at monitor and control of switches. Such means is of course limited to a condition change of switches (such as change in load amount of electricity, etc.) in a 1-to-N communication system for synchronizing the whole system by use of a power line carrier system.

The present invention is not limited to a communication system of power line carrier method for the distribution system, but may be embodied with equal effect by synchronizing the communication clocks over the whole system in a 1-to-N communication system.

It will thus be understood from the foregoing description that according to the present invention, a master station exchanges data with a plurality of terminal stations at the same time as an object of communication, and the synchronized operation of the master station with the terminal stations to shorten the transmission time with non-responding terminal stations, thereby making possible early detection of a condition change of the system.

We claim:

1. A remote monitor control system comprising a master station having means for communicating in synchronism with system communication clock signals for generating various commands required for monitor and control; a plurality of terminal stations having means for communication in synchronism with the system communication clock signals for receiving data relating to the conditions of objects being monitored and controlling objects to be controlled; and means for interconnecting said master station and said terminal stations by means of at least one communication line on which a signal establishing said system communication clock signals is obtained; wherein each of the terminal stations includes means responsive to receipt of a command from said master station for transmitting response data on said communication line at a respectively different time point form that of other terminal stations following the transmission of said command by the master station when the terminal station has response data to send, and means for shifting said time point for transmission of response data when said terminal station fails to detect transmission of response data from another terminal station which is to transmit response data at an earlier time point following transmission of said command by said master station.

2. A system according to claim 1, wherein said response data from the terminal stations to the master station includes a sync signal and a condition signal, and said means in each terminal station for shifting the time point including means for shifting the transmission time point of the terminal station by an amount corresponding to the length of the condition signal portion of said response data each time said terminal station fails to receive a sync signal from another terminal station which is to transmit at an earlier time period.

3. A system according to claim 2, wherein the command code has the same number of bits as the condition signal.

4. A remote monitor control system comprising a master station including means for communicating in synchronism with communication clock signals for generating various commands required for monitor and control; a plurality of terminal stations including means for communicating in synchronism with the communication clocks signals for receiving the conditions of objects being monitored and for controlling objects of control; and means for interconnecting said master station and said terminal stations by means of at least one communication line on which a signal establishing said system communication clock signals is obtained; wherein the master station further includes means for issuing a command on said communication line requiring a response only from terminal stations which have developed a condition change of the object being monitored, and the terminal stations including means for issuing response data in accordance with a designated time sequence to permit detection of a condition change of the object being monitored in a single data exchange; and wherein the master station and the terminal stations each include means for counting said communication clock signals at the same time and means responsive to a particular terminal station failing to respond at a predetermined response time in said designated time sequence for advancing the response timing of each terminal station in said designated time sequence by a predetermined length of time.

5. A system according to claim 4, wherein the command from the master station to the terminal stations includes a sync signal and a command code, and the response data from the terminal stations to the master station includes a sync signal and a condition signal, said system further comprising means in said master station and each terminal station for shifting the predetermined response time of terminal stations in said designated time sequence by an amount corresponding to the length of the condition signal set for a particular station when the sync signal is not received at the master station and the terminal stations.

6. A remote monitor control system according to claim 5, wherein the sync signals generated from the master station and the terminal stations have the same number of bits, and the command code has the same number of bits as the condition signal.

7. A remote monitor control system comprising a single master station having means for communicating in synchronism with communication clock signals for generating various commands required for monitor and control; a plurality of terminal stations having means for communicating in synchronism with the communication clock signals, for receiving data relating to the conditions of objects being monitored and for controlling objects of control; and means for interconnecting said master station and said terminal stations by means of at lest one communication line on which a signal establishing said system communication clock signals is obtained; the terminal station being divided into a plurality of groups each including a plurality of terminal stations; and each of said terminal stations including means for sending a response signal to said master station at a respective time point assigned to its terminal station group in a designated time sequence following receipt of a command from said master station on said communication line, and means for shifting the time point set for the terminal station groups when a response signal fails to be received from a terminal station group.

8. A system according to claim 7, wherein the command from the master station to the terminal stations includes a sync signal and a command code, and the response signal from the terminal stations to the master station includes a sync signal and a condition signal, said shifting means comprising means for shifting the time points assigned to the terminal station groups by an amount corresponding to the length of the condition signal set for a particular station when the sync signal is not received from the particular station.

9. A system according to claim 8, wherein the sync signals generated from the master station and the terminal stations have the same number of bits, and the command code has the same number of bits as the condition signal.

10. A method of controlling a system having a master station including means for communicating in synchronism with system communication clock signals for generating various commands required for monitor and control, a plurality of terminal stations including means for communicating with said master station in synchronism with the system communication clock signals and means interconnecting said master station and said terminal stations by means of at least one communication line on which a signal establishing the system communication clock signals is obtained, comprising the steps of:
sending a command from said master station to said terminal stations on said communication line;
in each terminal station, assigning to the particular terminal station a respective transmission time period in a sequence of transmission time periods following the sending of said command from said master station and during which the particular terminal station may send a reply to said master station on said communication line;
in each terminal station, counting said clock signals to determine when the assigned transmission time period of the particular terminal station occurs and sending a reply to said master station during said assigned transmission time period if a reply needs to be sent;

in each terminal station, detecting whether any other terminal station assigned to a transmission time period which is earlier in said sequence than the time period assigned to the particular station has not sent a reply to said master station on said communication line; and in said particular station, advancing its assigned transmission time period in said sequence by a predetermined amount of time for each of said other terminal stations which has not sent a reply.

11. A method according to claim 10, wherein said reply sent by said terminal stations includes a condition signal and said predetermined amount of time by which said assigned transmission time period of said particular station is advanced is equal to the length of said condition signal.

12. A method according to claim 10, further including the steps of:

in said master station, determining the total length of time to receive a reply from each terminal station on the basis of the number of terminal stations and the length of a transmission time period;

in said master station, counting said clock signals to determine each transmission time period of said sequence and detect whether a reply is received from said terminal stations during said transmission time periods; and reducing said total length of time to receive a reply for all stations and advancing the transmission time periods in said sequence by said predetermined amount of time for each terminal station which does not send a reply.

13. A method according to claim 12, wherein said reply sent by said terminal stations includes a sync signal and a condition signal, said master station detecting whether a terminal station sends a reply in its transmission time period by detecting whether said sync signal is received during an initial portion of said transmission time period.

14. A method according to claim 10, wherein said terminal stations are assigned in groups to transmission time periods so that the terminal stations of the same group have the same transmission time period.

* * * * *